United States Patent [19]

Kalfoglou et al.

[11] 4,099,537

[45] Jul. 11, 1978

[54] METHOD FOR TRANSPORTATION OF VISCOUS HYDROCARBONS BY PIPELINE

[75] Inventors: George Kalfoglou, Houston; Kenoth H. Flournoy, Levelland, both of Tex.

[73] Assignee: Texaco Inc., New York, N.Y.

[21] Appl. No.: 664,711

[22] Filed: Mar. 8, 1976

[51] Int. Cl.$^2$ .......................... F17D 1/17; B01F 17/00
[52] U.S. Cl. .................. 137/13; 252/8.55 R; 252/312; 252/352; 252/353
[58] Field of Search .............. 252/8.3, 8.55 R, 8.55 D; 137/13; 302/66

[56] References Cited

U.S. PATENT DOCUMENTS

| | | | |
|---|---|---|---|
| 2,535,677 | 12/1950 | Hollander et al. | 260/513 |
| 3,467,195 | 9/1969 | McAuliffe et al. | 252/8.55 X |
| 3,487,844 | 1/1970 | Simon et al. | 137/13 |
| 3,491,835 | 1/1970 | Gagle | 137/13 X |
| 3,500,923 | 3/1970 | Reisberg | 166/275 X |
| 3,630,953 | 12/1971 | Simon et al. | 252/8.3 X |
| 3,811,507 | 5/1974 | Flournoy et al. | 252/8.55 X |
| 3,827,497 | 8/1974 | Dycus et al. | 252/8.55 X |
| 3,943,954 | 3/1976 | Flournoy et al. | 137/13 |
| 3,977,471 | 8/1976 | Gale et al. | 166/273 |

*Primary Examiner*—Herbert B. Guynn
*Attorney, Agent, or Firm*—Carl G. Ries; Thomas H. Whaley; Walter D. Hunter

[57] ABSTRACT

A method of transporting viscous hydrocarbons which involves introducing into a pipeline or well-bore with the viscous hydrocarbons a solution containing an oxyalkylated anionic surfactant such as sodium nonyl phenol polyoxyethylene sulfonate or a mixture of such surfactants and, optionally, with an alkalinity agent thereby forming a low-viscosity, salt-tolerant oil-in-water emulsion.

2 Claims, No Drawings

METHOD FOR TRANSPORTATION OF VISCOUS HYDROCARBONS BY PIPELINE

BACKGROUND OF THE INVENTION

1. Field of the Invention

This invention relates to an improved method for transporting hydrocarbons through a pipeline or a wellbore. More particularly, this invention relates to the introduction into a pipeline of a viscous hydrocarbon or mixture of hydrocarbons together with an aqueous solution of an oxyalkylated anionic surfactant or a mixture of oxyalkylated anionic surfactant, whereby a low-viscosity, salt-tolerant oil-in-water emulsion is formed which facilitates movement of the hydrocarbon in the pipeline. Optionally, the solution may contain an alkalinity agent such as an alkali metal hydroxide.

2. Description of the Prior Art

The transportation of heavy crudes by pipeline is difficult because of their low mobility and high viscosity. The usual methods to facilitate the flow of heavy crudes have included cutting them with lighter fractions of hydrocarbons. However, the procedures involve the use of relatively large amounts of expensive hydrocarbon solvents to transport a relatively cheap product. This practice also necessarily requires the availability of the cutting hydrocarbon solvents which, in some instances is inconvenient.

Another method to assist the flow of hydrocarbons in pipeline is the installation of heating equipment at frequent intervals along the pipeline, whereby the crude is heated to reduce is viscosity and thereby facilitate its transport.

Heaters employed for this purpose can be operated by withdrawing some of the crude being transported for use as fuel. However, this procedure may result in the loss of as much as 15 to 20% of the crude being transported.

Other methods to facilitate transport of heavy crudes have employed thermal viscosity breaking which, however, produces substantial amounts of gas.

It is known that substantial amounts of water may be introduced into a pipeline containing a stream of viscous crude flowing therethrough to reduce the drag on the stream and thus facilitate the flow through the pipeline. This has been done by the addition of water together with crude into the pipeline such that a water-in-oil emulsion is formed.

It is thus an object of the present invention to provide a transport method for viscous crudes which are not easily emulsifiable especially in the presence of water with substantial salt content whereby they can be more easily transported by piepline at a high thru-put rate.

SUMMARY OF THE INVENTION

This invention relates to a method for transporting viscous hydrocarbons such as crude oil in which the hydrocarbons together with an aqueous solution of an oxyalkylated anionic surfactant or a mixture of oxyalkylated anionic surfactants is introduced into a pipeline thereby forming a low-viscosity, salt-tolerant oil-in-water emulsion. Optionally, the aqueous solution may contain an alkalinity agent.

DESCRIPTION OF THE INVENTION

As previously pointed out, this invention is concerned with a method of transportation via pipeline of viscous oils in an oil-in-water emulsion wherein the water phase is formed using highly saline and/or hard water, e.g., water containing appreciable quantities of sodium chloride and/or water-soluble salts of divalent cations such as calcium or magnesium.

One group of anionic oxyalkylated surfactants which are especially useful in the process of this invention include sulfonate compounds of the formula:

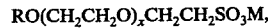

where R is selected from the group consisting of alkyl of from 10 to 25 carbon atoms;

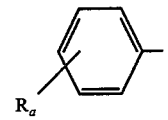

where $R_a$ is an alkyl of from 8 to 25 carbon atoms and

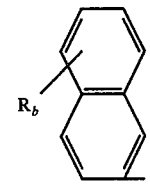

where $R_b$ is an alkyl of from 8 to 25 carbon atoms, $x$ is an integer of from 1 to 15 and M is a metallic cation such as sodium, potassium, lithium or the ammonium ion.

Another group of anionic oxyalkylated surfactants which are suitable for use in the process of this invention include block-type sulfonate compounds of the formula:

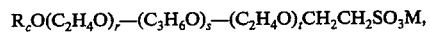

wherein $R_c$ is selected from the group consisting of alkyl of from 10 to 25 carbon atoms,

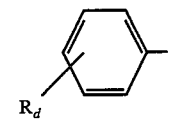

wherein $R_d$ is alkyl of from 8 to 25 carbon atoms and

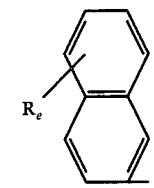

wherein $R_e$ is alkyl of from 8 to 25 carbon atoms; $r$ is an integer of from 2 to about 10, $s$ is an integer of from 1 to about 8, $t$ is an integer of from 2 to about 10 and the sum of $r + s + t$ is not more than 20, wherein at least 60 percent of the oxyalkylene units are oxyethylene units and M is a metallic cation selected from the group consisting of sodium, potassium, lithium or an ammonium ion.

Block-type sulfonate surfactants as described above may be prepared by first condensing ethylene oxide with a suitable initiator in the presence of, for example, about 0.12 weight percent of sodium hydroxide in a stirred autoclave maintained at 95°–100° C. After devolatilizing the resulting product to remove low boiling product, if desired, a second condensation reaction is conducted with propylene oxide under the same conditions and finally a third condensation is conducted with ethylene oxide. After the block-type oxyalkylated precursor has been prepared, it is reacted with sulfurous oxychloride (i.e., SOCl₂) to replace the terminal hydroxyl group with chlorine and this intermediate may then be reacted with sodium sulfite to form the desired sulfonate. This sulfonation reaction is below where, for purposes of illustration, the sulfonation of polyethoxylated alkylphenol is set forth:

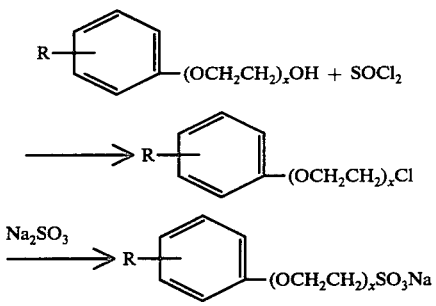

These same sulfonates can also be prepared by first forming the corresponding sulfate salt and then reacting the sulfate salt with sodium sulfite. This last-mentioned reaction is considered less desirable than the SOCl₂-Na₂SO₃ method since drastic reaction conditions must be employed to force the sulfate reaction to completion.

Another suitable group of anionic oxyalkylated surfactants for use in this invention include sulfate compounds of the formula:

wherein $R_f$ is selected from the group consisting of alkyl of from 10 to 25 carbon atoms and

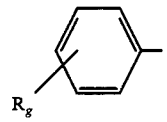

wherein $R_g$ is alkyl of from 8 to 25 carbon atoms, $m$ is an integer of from 1 to about 14 and M is a metallic cation such as sodium, potassium, lithium or the ammonium ion. For example, sodium tridecyl-polyoxyethylene sulfate and potassium nonylphenol polyoxyethylene sulfate are preferred sulfate-type surfactants.

In this invention the aqueous solution added to the viscous hydrocarbon will generally range from a minimum of about 8 percent by volume based on the volume of the hydrocarbon introduced into the pipeline up to a maximum of about 60 percent or more by volume with the preferred amount being about 20 to about 40 percent by volume on the same basis. In the aqueous solution the concentration of the anionic oxyalkylated surfactant or mixtures thereof will range from about 0.01 to about 2.5 weight percent.

If employed, the alkalinity agent which can be selected from the group consisting of sodium hydroxide, potassium hydroxide and lithium hydroxide will range in concentration from about 0.01 to about 1.0 weight percent.

The following example illustrates an embodiment of this invention which is to be considered not limitative:

EXAMPLE

An aqueous solution comprising about 0.5 weight percent of an anionic surfactant having the formula:

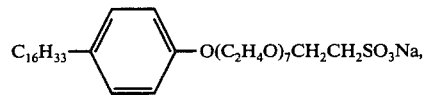

0.12 weight percent of a sulfate surfactant having the formula $C_{12}H_{25}O(CH_2CH_2O)_4SO_3K$, is formed by mixing together at a temperature of about 25° C. the above-named ingredients with brine having a salinity and hardness of about 1.65 weight percent. The thus-formed aqueous solution is introduced into a pipeline together with heavy Utah crude to give an oil-in-water emulsion in which the volume percent of the aqueous solution based on the volume of the crude is about 26 percent. An appreciable saving in horsepower requirement for pumping 4,000 barrels/day of the emulsion through the pipeline over the requirement for the same amount of this Utah heavy crude under the same condition is achieved.

What is claimed is:

1. In the transportation of viscous hydrocarbons by pipeline, the improvement which comprises forming an oil-in-water emulsion by inroducing into the pipeline with said hydrocarbons an aqueous solution of an oxyalkylated anionic surfactant wherein the amount of the aqueous solution of the surfactant introduced into the pipeline with the said hydrocarbon ranges from about 8 to about 60 percent by volume based on the volume of the hydrocarbon introduced into the pipeline, wherein the concentration of the said surfactant in the aqueous solution is from about 0.01 to about 2.5 weight percent and wherein the oxyalkylated surfactant is a compound of the formula:

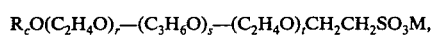

wherein $R_c$ is selected from the group consisting of alkyl of from 10 to 25 carbon atoms;

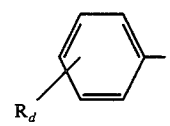

wherein $R_d$ is alkyl of from 8 to 25 carbon atoms, and

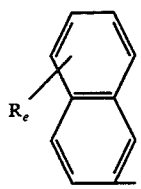

wherein $R_e$ is alkyl of from 8 to 25 carbon atoms; $r$ is an integer of from 2 to about 10; $s$ is an integer of from 1 to about 8; $t$ is an integer of from 2 to about 10, and the sum of $r + s + t$ is not more than 20, wherein at least 60 percent of the oxyalkylene units are oxyethylene units and wherein M is selected from the group consisting of sodium, potassium, lithium and the ammonium ion.

2. In the transportation of viscous hydrocarbons by pipeline, the improvement which comprises forming an oil-in-water emulsion by introducing into said pipeline with said hydrocarbon an aqueous solution of from about 0.01 to about 2.5 weight percent of an oxyalkylated anionic surfactant and about 0.01 to about 1.0 weight percent of an alkalinity agent selected from the group consisting of sodium hydroxide, potassium hydroxide and lithium hydroxide, wherein the amount of the aqueous solution of the surfactant introduced into the pipeline with the said hydrocarbon ranges from about 8 to about 60 percent by volume based on the volume of the hydrocarbon introduced into the pipeline, wherein the oxyalkylated surfactant is a compound of the formula:

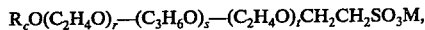

wherein $R_c$ is selected from the group consisting of alkyl of from 10 to 25 carbon atoms;

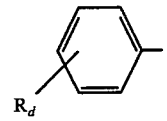

wherein $R_d$ is alkyl of from 8 to 25 carbon atoms and

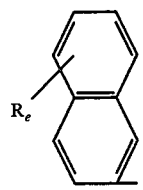

wherein $R_e$ is alkyl of from 8 to 25 carbon atoms; $r$ is an integer of from 2 to about 10, $s$ is an integer of from 1 to about 8, $t$ is an integer of from 2 to about 10, the sum of $r + s + t$ is not more than 20, wherein at least 60 percent of the oxyalkylene units are oxyethylene and wherein M is selected from the group consisting of sodium, potassium, lithium and the ammonium ion.

* * * * *